United States Patent
i Dalfo et al.

(10) Patent No.: US 8,805,778 B2
(45) Date of Patent: *Aug. 12, 2014

(54) TECHNIQUES TO CROSS-SYNCHRONIZE DATA

(75) Inventors: Ricard Roma i Dalfo, Redmond, WA (US); Rolando Jimenez Salgado, Redmond, WA (US); Satish Thatte, Redmond, WA (US); Anton Kirillov, Seattle, WA (US); Maarten Mullender, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/362,822

(22) Filed: Jan. 31, 2012

(65) Prior Publication Data
US 2012/0130945 A1 May 24, 2012

Related U.S. Application Data

(63) Continuation of application No. 11/709,451, filed on Feb. 22, 2007, now Pat. No. 8,131,670.

(51) Int. Cl.
*G06F 17/30* (2006.01)
(52) U.S. Cl.
CPC ............................... *G06F 17/30578* (2013.01)
USPC ........... 707/610; 707/612; 707/614; 707/617; 707/620; 707/624

(58) Field of Classification Search
USPC .......................... 707/610, 612, 617, 620, 624
See application file for complete search history.

(56) References Cited

U.S. PATENT DOCUMENTS

| | | |
|---|---|---|
| 5,684,990 A | 11/1997 | Boothby |
| 6,275,831 B1 | 8/2001 | Bodnar et al. |
| 6,295,541 B1 | 9/2001 | Bodnar et al. |
| 6,505,200 B1 | 1/2003 | Ims et al. |
| 6,675,178 B1 | 1/2004 | Chinchar et al. |
| 6,901,380 B1 | 5/2005 | Bremers |
| 6,983,293 B2 | 1/2006 | Wang |

(Continued)

OTHER PUBLICATIONS

Muth et al., "From Centralized Workflow Specification to Distributed Workflow Execution", http://coblitz.codeen.org:3125/citeseer.ist.psu.edu/cache/papers/cs/552/h ttp:zSzzSzparis.cs.uni-sb.dezSzpublic.sub—htmlzSzpaperszSzJIIS97.pdf/mut- h98from.pdf, 25 pgs.

(Continued)

*Primary Examiner* — Apu Mofiz
*Assistant Examiner* — Cindy Nguyen
(74) *Attorney, Agent, or Firm* — Thomas Wong; Raghu Chinagudabha; Micky Minhas

(57) ABSTRACT

Techniques to cross-synchronize data are described. An apparatus may comprise a cross-synchronization component to synchronize multiple data items for different application programs between multiple client devices synchronized using multiple synchronization circuits. The cross-synchronization component may determine whether changes to the multiple data items made at a first client device are propagated to a second client device using consistency information maintained by a consistency group item for a consistency group including the data items. Other embodiments are described and claimed.

20 Claims, 3 Drawing Sheets

(56) References Cited

U.S. PATENT DOCUMENTS

| | | |
|---|---|---|
| 7,024,457 B1 | 4/2006 | Newman et al. |
| 7,415,486 B2 | 8/2008 | Multer |
| 2002/0073011 A1 | 6/2002 | Brattain et al. |
| 2002/0169745 A1 | 11/2002 | Hotti et al. |
| 2003/0158767 A1 | 8/2003 | Nwafor et al. |
| 2003/0162555 A1 | 8/2003 | Loveland |
| 2005/0125463 A1 | 6/2005 | Joshi et al. |
| 2006/0031301 A1 | 2/2006 | Herz et al. |
| 2006/0031927 A1 | 2/2006 | Mizuno et al. |
| 2006/0095476 A1 | 5/2006 | Dauer et al. |
| 2006/0106881 A1 | 5/2006 | Leung et al. |
| 2006/0200583 A1 | 9/2006 | Le Lann et al. |
| 2007/0067354 A1 | 3/2007 | Mullender et al. |
| 2008/0168126 A1 | 7/2008 | Freedman |
| 2008/0208919 A1 | 8/2008 | i Dalfo et al. |

OTHER PUBLICATIONS

Papazoglou, Michael P., "Web Services and Business Transactions", Date: 2003, http://citeseer.ist.psu.edu/cache/papers/cs/27582/http:zSzzSzwww.uv- t.nlzSzinfolabzSzpubzSzdbzSzwww-journal-2003.pdf/papzoglou03web.pdf., pp. 1-20.

Papazoglou, Michael P., "Web Services and Business Transactions", Date: 2003, http://citeseer.ist.psu.edu/cache/papers/cs/27582/http:zSzzSzwww.uv- t.nlzSzinfolabzSzpubzSzdbzSzwww-journal-2003.pdf/papzoglou03web.pdf., pp. 21-43.

Sairamesh et al., "Disconnected Processes, Mechanisms and Architecture for Mobile E-Business", Date: Dec. 2004, pp. 651-662, vol. 9, Issue 6, Kluwer Academic Publishers, Hingham, MA, USA, httpdeliveryacmorg/10.1145/1040000/1035726/p651-sairamesh.pdf, 12 pgs. key1=1-035726&key2=2548711611&coll=GUIDE&dl=GUIDE&CFID=2484473&CFTOKEN=47525820.

Sutherland et al., "Enterprise Application Integration and Complex Adaptive Systems", Date: Oct. 2002, vol. 45, No. 10, http://jeffsutherland.com/papers/acm/Sutherland2002cacm.pdf., 6 pgs.

200

```
┌─────────────────────────────────────────┐
│  MODIFY A FIRST DATA ITEM FOR A FIRST   │
│  APPLICATION PROGRAM AND A SECOND DATA  │
│  ITEM FOR A SECOND APPLICATION PROGRAM  │
│         AT A FIRST CLIENT DEVICE        │
│                   202                   │
└─────────────────────────────────────────┘
                     │
┌─────────────────────────────────────────┐
│   INITIATE SYNCHRONIZING OPERATIONS TO  │
│    SYNCHRONIZE THE FIRST DATA ITEM      │
│   WITH A CORRESPONDING FIRST DATA ITEM  │
│   AND THE SECOND DATA ITEM WITH A       │
│   CORRESPONDING SECOND DATA ITEM AT A   │
│   SECOND CLIENT DEVICE USING RESPECTIVE │
│   FIRST SYNCHRONIZATION CIRCUIT AND     │
│      SECOND SYNCHRONIZATION CIRCUIT     │
│                   204                   │
└─────────────────────────────────────────┘
                     │
┌─────────────────────────────────────────┐
│   DETERMINE WHETHER THE CORRESPONDING   │
│     FIRST DATA ITEM IS CONSISTENT       │
│     WITH THE CORRESPONDING SECOND       │
│     DATA ITEM AT THE SECOND CLIENT      │
│                 DEVICE                  │
│                   206                   │
└─────────────────────────────────────────┘
```

FIG. 2

TECHNIQUES TO CROSS-SYNCHRONIZE DATA

BACKGROUND

In a client-server system, there are typically multiple client devices communicating with one or more servers. One service provided by client-server systems is the ability to synchronize data between a client device and a server, and between multiple client devices via a server. This may be desirable when a single user utilizes multiple client devices, such as a laptop computer and desktop computer. The server may be used to promote changes to data from one client device to another client device, thereby avoiding the need for a user to make the same change multiple times. In some cases, however, a client device may need to maintain synchronization with more than one server. This may complicate synchronization operations, since one synchronization operation may potentially interfere with another synchronization operation, one synchronization operation may be slower than another synchronization operation, one synchronization operation may have connectivity while the other does not, and other reasons. Consequently, there may be a need for improved synchronization techniques for a device or network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be directed to cross-synchronization techniques for client devices using services provided by multiple client-server systems. More particularly, some embodiments may be directed to cross-synchronization techniques for synchronizing data between multiple client databases and multiple client devices. This may be advantageous when, for example, each client database implements an independent synchronization technique with a different server in different client-server systems. In one embodiment, for example, a client device may include a cross-synchronization component. The cross-synchronization component may be arranged to synchronize multiple data items for different application programs between multiple client devices synchronized using multiple synchronization circuits. The cross-synchronization component may determine whether changes to the multiple data items made at a first client device are propagated to a second client device using consistency information maintained by a consistency group item for a consistency group including said data items. In this manner, changes to data in maintained by different client databases may be promoted or replicated to the other client devices in an efficient manner without disrupting any synchronization operations between different client-server systems. Other embodiments are described and claimed.

BRIEF DESCRIPTION OF THE DRAWINGS

FIG. 2 illustrates one embodiment of a logic flow.

DETAILED DESCRIPTION

Figure 1:
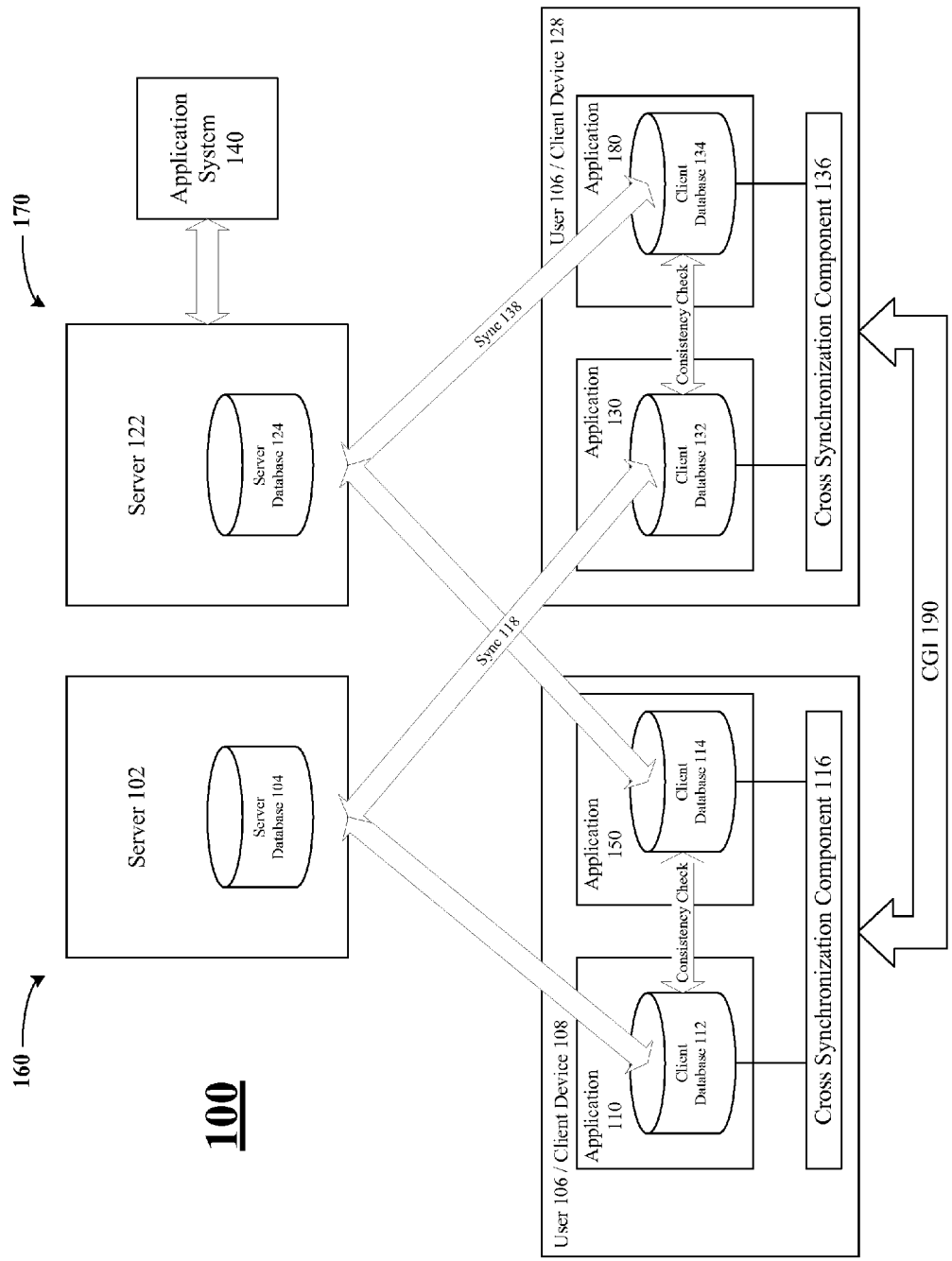
FIG. 1 illustrates one embodiment of a synchronization system.

Various embodiments may be directed to cross-synchronization techniques for synchronizing data between multiple client databases for multiple client devices. This may be advantageous when, for example, each client database implements an independent synchronization technique with a different server in different client-server systems. For example, a client device may include a first client database or data store for a productivity application program, such as an application program from the MICROSOFT® OFFICE suite of application programs made by MICROSOFT CORPORATION, Redmond, Wash., such as a MICROSOFT OUTLOOK® application program. The productivity application program may synchronize data with a first server, such as a MICROSOFT EXCHANGE® server, for example. The client device may also include a second client database or data store for a line of business (LOB) data used by an LOB application program. The LOB data may be synchronized with a second server that is a different server from the first server. For example, the second server may comprise a middle-tier LOB server for a LOB system. In some cases, however, the different synchronization techniques used by the client devices may lead to inconsistent data between data stored by the first client database and second client database. For example, a productivity application program storing data in the first client database may embed or reference LOB data stored by the second client database. The synchronization technique used for the data stored in the first client database, however, may be different from the synchronization technique used by the data stored by the second client database. As a result, cases may arise where the data between the respective databases of each client device may be synchronized at different times, or not at all, thereby leading to inconsistencies between internal databases on a given client device. Consequently, the client device may need to efficiently cross-synchronize data between multiple internal client databases without disrupting or affecting synchronization operations between each client database and different servers. Accordingly, various embodiments comprise a cross-synchronization technique to cross-synchronize data between various client databases and various client devices in an efficient and effective manner.

It is worthy to note that although some embodiments may describe structures, events, logic or operations using the terms "first," "second," "third," and so forth, such terms are used merely as labels, and are not intended to impose numerical requirements on their objects. Further, any structures, events, logic or operations using such terms may be reversed for a given implementation. For example, the first client database may comprise an OUTLOOK client database and the second client database may comprise an LOB client database in one embodiment, while in another embodiment the first client database may comprise an LOB client database and the second client database may comprise an OUTLOOK client database. Similarly, the first server may comprise an EXCHANGE server and the second server may comprise a middle-tier LOB server in one embodiment, while in another embodiment the first server may comprise an LOB server and the second server may comprise an EXCHANGE server. Consequently, the terms "first," "second," "third," and so forth are used merely as labels to differentiate elements and not necessarily limit the structure, events, logic or operations for the elements.

FIG. 1 illustrates one embodiment of a synchronization system 100. The synchronization system 100 may be suitable for synchronizing data among various devices and systems. As shown in FIG. 1, the synchronization system 100 includes two client-server systems. The first client-server system 160 comprises a server 102 and client devices 108, 128. The second client-server system 170 comprises a server 122 and client devices 108, 128. The servers 102, 122 may each comprise, among other elements, respective server databases 104, 124. The client devices 108, 128 may each comprise, among other elements, respective application programs 110, 130 and respective application programs 150, 160. The application programs 110, 130 may each use respective client databases 112, 132. The application programs 150, 160 may each use respective client databases 114, 134. The server 122 may be further connected to an application system 140. The client devices 108, 128 may also communicate information via a consistency group item (CGI) circuit 190. It may be appreciated that although some embodiments may be described in terms of a client-server system, other embodiments may be implemented for peer-to-peer systems as well. The embodiments are not limited in this context.

In one embodiment, for example, the first client-server system 160 may be implemented as an EXCHANGE system, made by MICROSOFT CORPORATION, Redmond, Wash. EXCHANGE is a messaging platform. The server 102 may be implemented as an EXCHANGE server. The client devices 108, 128 may be implemented as EXCHANGE clients. The applications 110, 130 residing and executed by respective client devices 108, 128 may be implemented as OUTLOOK application programs. OUTLOOK is a personal information manager and is part of the MICROSOFT OFFICE suite of application programs. Although often used mainly as an electronic mail (email) application, it also provides other application services such as calendar, task and contact management, note taking, and a journal. Application programs 110, 130 can be used as stand-alone applications, but can also operate in conjunction with the EXCHANGE server 102 to provide enhanced functions for multiple users in an organization, such as shared mailboxes and calendars, public folders and meeting time allocation. Client data for the OUTLOOK application programs 110, 130 may be stored in the respective OUTLOOK client databases 112, 132.

In one embodiment, for example, the second client-server system 170 may be implemented as part of a line of business (LOB) system. A LOB application system 140 may include various LOB application programs typically implemented on enterprise hardware platforms for a business entity. The applications 150, 160 residing and executed by respective client devices 108, 128 may be implemented as LOB application programs, such as LOB client application programs. LOB application programs are application programs designed to provide various business application services. Examples of LOB application programs may include a Customer Relationship Management (CRM) application program, an Enterprise Resource Planning (ERP) application program, a Supply Chain Management (SCM) application program, and other business application programs using business-oriented application logic. Various application programs such as LOB application programs may build and use customized data models stored as structured documents, such as Extensible Markup Language (XML) or Hypertext Markup Language (HTML) documents. In one embodiment, for example, the server 122 may be implemented as a LOB middle-tier server system that assists in communicating LOB information between the LOB application system 140 and the client devices 108, 128. Client data for the LOB application system 140 may be stored in the LOB client databases 114, 134. In some cases, the LOB client databases 114, 134 may each be referred to as a Client Data Store (CDS), and the server database 124 for the LOB server 122 may be referred to as a Middle-Tier Data Store (MDS).

Each of the client-server systems 160, 170 typically implements a separate synchronization technique for synchronizing data between multiple client devices 108, 128. For example, the client-server systems 160, 170 implement respective synchronization circuits 118, 138 for synchronizing client data between the client devices 108, 128, and between the servers 102, 122 and the client devices 108, 128. Data changes can come from any number of different places, including the user 106 at the client devices 108, 128 via a graphic user interface (GUI), and the servers 102, 122 promoting changes. In the context of EXCHANGE services provided by the server 102, changes could also occur from other clients such as an OUTLOOK Web Access, other OUTLOOK client machines for the same user, other synchronization partners to OUTLOOK, mobile applications, third party applications, and so forth.

By way of example, the EXCHANGE system 160 may implement a synchronization circuit 118 between the client devices 108, 128 via the server 102. In this manner, any modifications to the OUTLOOK client data stored by the client database 112 for the OUTLOOK application program 110 made on the client device 108 may be replicated to the client database 132 for the OUTLOOK application program 130 on the client device 128, and vice-versa. Similarly, the LOB system 170 may implement a synchronization circuit 138 between the client devices 108, 128 via the server 122. In this manner, any modifications to the LOB client data stored by the client database 114 for the LOB application program 150 made on the client device 108 may be replicated to the client database 134 on the client device 128, and vice-versa.

Problems may occur, however, when using synchronization circuits 118, 138. In some cases, for example, the OUTLOOK application program 110 may include, share, or be associated with LOB information stored in the LOB client database 114. Therefore, modifications to the OUTLOOK client data set or the LOB client data set may force multiple replication events via the synchronization circuits 118, 138 across both of the client-server systems 160, 170. This may consume unnecessary amounts of bandwidth as well as potential conflicts. Further, changes may be made for a given set of data from many different entities, both internal and external. Combined with the multiple synchronization events occurring between the various data stores and different servers, the chances of data conflicts and inconsistencies between the OUTLOOK client data set and the LOB client data set becomes significant.

Various embodiments attempt to solve these and other problems by implementing novel cross-synchronization techniques in the client devices 108, 128. In some embodiments, the cross-synchronization components 116, 136 may be implemented in the respective client devices 108, 128. In one embodiment, for example, the cross-synchronization component 116 may be used to synchronize changes to client data stored by the client databases 112, 114. In one embodiment, for example, the cross-synchronization component 136 may be used to synchronize changes to client data stored by the client databases 132, 134. In some cases, the cross-synchronization components 116, 136 may perform synchronization operations while reducing unnecessary traffic on the synchronization circuits 118, 138. The cross-synchronization circuits 118, 138 will provide an end user help in resolving data conflicts, and ultimately provide a platform that the application developer can utilize without having to solve cross-synchronization problems. It is worthy to note that although some embodiments may describe cross-synchronization operations with respect to client device 108 or client device 128, it may be appreciated that the same cross-synchronization operations may apply to both the client devices 108, 128.

As used herein the terms "component" and "system" are intended to refer to a computer-related entity, either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In one embodiment, for example, the cross-synchronization components 116, 136 may be implemented to perform consistency checks between one or more local databases designed to store OUTLOOK information and one or more local databases designed to store LOB information. In some cases, OUTLOOK may provide a single view having both OUTLOOK information and LOB information. For example, a Folder List from an OUTLOOK application program typically illustrates multiple folders for multiple OUTLOOK items. Some of the OUTLOOK items are regular OUTLOOK items referred to as OUTLOOK built-in items and are typically stored in the OUTLOOK client database 112 as an ".OST" file. Some of the OUTLOOK items, however, may reference or contain LOB information. These OUTLOOK items may be referred to as OUTLOOK/LOB items and are typically stored in the OUTLOOK client database 112 as a ".PST" file. Although various implementation examples for the cross-synchronization components 116, 136 may be described in the context of OUTLOOK/LOB items, information and application programs, it may be appreciated that the cross-synchronization components 116, 136 may be implemented for any two or more databases that maintain the same or similar types of data that may benefit from consistency checks between various local databases holding such data.

In various embodiments, the cross-synchronization components 116, 136 provide the infrastructure needed to move data between the OUTLOOK client databases 112, 132 and the respective LOB client databases 114, 134. There are two basic sets of LOB data stored by OUTLOOK. The first is the LOB data stored in folders maintained by EXCHANGE (e.g., in the .OST file). The second is the LOB data that is stored in folders in the LOB store (e.g., in the .PST file). The exchange based data has the more difficult synchronization problem as its data can also be changed by other exchange based clients. The assumption with exchange based data is that other OUTLOOK clients will be updated via the EXCHANGE server 102 to MICRSOFT OUTLOOK application programs 110, 130 synchronization process via the synchronization circuit 118. Non-exchange based data is that data in the LOB store (e.g., in the .PST file), and this data can be changed by the LOB client or by OUTLOOK application programs 110, 130 opening the appropriate forms. The non-exchange based data will typically not be changed, however, by the EXCHANGE server 102. One distinguishing characteristic of non-exchange based data is that the OUTLOOK application programs 110, 130 will not have this data updated via the synchronization circuit 118.

In various embodiments, the cross-synchronization component 116 will help provide a solution to perform consistency checks and synchronizing data between the OUTLOOK client database 112 and the LOB client database 114, and the cross-synchronization component 136 will help provide a solution to synchronizing data between the OUTLOOK client database 132 and the LOB client database 134. For example, when a new OUTLOOK built-in item is created in the OUTLOOK application programs 110 as stored in an ".OST" file of the OUTLOOK client database 112, a related transaction will be created in the LOB client database 114. In another example, when a new OUTLOOK/LOB item is created in the OUTLOOK application program 110 as stored in a ".PST" file of the OUTLOOK client database 112, a related transaction will be created in the LOB client database 114. Changes to both items are then kept up-to-date via the cross-synchronization components 116, 136.

The cross-synchronization techniques may provide several advantages over conventional synchronization techniques. One advantage is that the cross-synchronization techniques may allow multiple objects from different systems to appear as a single object to the user. For example, this is the case with appointments on a user's calendar and the related time objects, such as a time tracking object. To the user, these are the same appointment and they are working on a specific project. Technically, these are two different systems tracking data that spans between the two. Another advantage is that the cross-synchronization techniques may promote changes made between systems, such as when the changes occur outside of the framework where the two separate objects are not kept "consistent," and when changes made to the client device/application need to get cross-synchronized to the owning server.

The operation and usefulness of synchronization system 100 may be further described by way of the following examples and use scenarios. Many users use multiple devices to perform their work. For example, some users work on a desktop while at work and use a laptop elsewhere. Users should be able to start working on one device and continue on another. A manager may have an employee contact in OUTLOOK and related employee information from various sources (e.g., salary information, organizational information, review information, experience information, and so forth) all displayed in a combined user interface (UI) in OUTLOOK. When changing this information on the desktop at work, the manager should be able to continue working at home. If some of the information was synchronized, but not all, the synchronization system 100 should issue a warning. If an error occurred during synchronization because some of the changes were not accepted by the LOB system, for example, the manager should be notified and be able to correct the situation on the laptop at home.

The cross-synchronization components 116, 136 uses and leverages from the synchronization circuit 138 (sometimes referred to as "CRUD-sync") between the Client Data Store (CDS) and LOB systems and other synchronization techniques, such as the synchronization circuit 118 offered by OUTLOOK and OUTLOOK EXCHANGE. In some cases, however, the cross-synchronization components 116, 136 may not necessarily be designed to influence such synchronization circuits 118, 138.

The cross-synchronization operations of the cross-synchronization components 116, 136 are designed to keep information between the various sub-systems consistent or in harmony. The relationship between the various pieces of information may be complex. For instance, someone working in an account team may want the contact information in OUTLOOK to reflect the contact information for that account in the CRM system, and at the same time with the contact information kept in SHAREPOINT. This does not necessarily mean that all such information will be identical. There may be contacts in OUTLOOK that should not be synchronized to the CRM system and vice-versa. Not all contacts in the CRM system should be displayed in OUTLOOK, but the information of any particular contact may diverge. For example, the account manager may have personal information about the contact that should not be shared, such as the spouse's birthday, the name of a pet, or a topic to be discussed in the next conversation. This type of information is typically private to the account manager, and although related to the OUTLOOK contact, should not be visible anywhere other than the CRM contact.

Taking this example one step further, in human resource scenarios, the employee contact information cannot be changed by others. If a manager has the contact information for their department on their system, and the phone number of a colleague is entered such that the manager's system cannot use it, the manager may want to change it. The OUTLOOK portion of the contact is owned by the manager. The human resource portion is owned by the LOB system. The manager should be able to change their part without being blocked by the part that is owned by another system. Such restrictions or limits may be implemented using "promotion and demotion" operations for certain properties, as described in more detail later.

In various embodiments, the cross-synchronization operations attempt to maintain the items of various sub-systems consistent, although not necessarily identical. The main example for cross-synchronization operations may be described in the context of maintaining consistency between OUTLOOK items and LOB items. Other scenarios include the consistency between items in different LOB systems, the information contained in documents, their properties and items in LOB systems. The term "item" is used to mean a view on an LOB entity, OUTLOOK item, document information in SHAREPOINT, or any other unit of information that can be uniquely identified and has to be managed.

The cross-synchronization operations assume the user works on a set of items on different client systems, such as the client devices 108, 128, and that both the application designer and the user want to keep these items in synchronization. These items will use various synchronization circuits for their synchronization, such as the synchronization circuits 118, 138, and potentially others as well.

In one embodiment, the cross-synchronization operations for the cross-synchronization components 116, 136 will be described in the context of OUTLOOK Contact (OC) items and CRM Contact (CC) items. The two systems share some information, but each has information that is not available in the other. The OUTLOOK user interface shows a combination of the two. An OUTLOOK inspector shows the OUTLOOK contact information, and it has some additional regions to display the CRM contact information.

In various embodiments, the synchronization system 100 synchronizes OC information stored in the OUTLOOK ".OST" file using server 102. The user may change the information at will on a LOBi client or on a non-LOBi client, such as in a MICROSOFT OUTLOOK WEB ACCESS (OWA) or using a remote device, for example. A LOBi client may refer to a LOB client that supports cross-synchronization operations.

In various embodiments, the synchronization system 100 synchronizes CC information stored in the CDS using the LOBi synchronization services of the synchronization circuit 138. The user may change this information on a LOBi client or a non LOBi client using the LOB's UI, for example.

The cross-synchronization components 116, 136 promote or demote properties between the OC and the CC. This initiates or performs the cross-synchronization operations between client-server systems 160, 170.

There are at least three basic scenarios for modifying data stored by the client databases maintained by the client devices 108, 128, as well as combinations of these three scenarios. First, a user may change contact information on a LOBi client. The OC change synchronizes through the server 102 via the synchronization circuit 118 (e.g., OUTLOOK synchronization) to the other clients, and the CC change propagates through the server 122 via the synchronization circuit 138 (e.g., LOBi synchronization) to the LOB and to the other clients. Second, a user may make a change to a contact item in OWA. This change propagates to the other clients. At least one of the clients needs to propagate the change from the OUTLOOK contact item to the CRM contact item. Depending on the LOB, the change should not propagate to the LOB server 122 more than once. Third, a user may make a change to the CRM contact item. The change propagates to the other clients and at least one of the clients needs to propagate the change to the OUTLOOK contact item. Combinations include changes made in multiple places, various states of connectedness, and speed of synchronization. Some of these typically lead to a conflict, while others should remain invisible to the user. Conflicts can often also be handled automatically and otherwise they have to be surfaced so the user can resolve the issue. The cross-synchronization components 116, 136 should be designed to detect all conflicts but only surface conflicts when needed.

The cross-synchronization components 116, 136 should be arranged to perform various groups of operations. First, the cross-synchronization components 116, 136 should be arranged to perform consistency checks to detect whether all items of a group of associated items are consistent with one another and if not, which ones are new and which ones are old. Second, the cross-synchronization components 116, 136 should be arranged to propagate changes made to certain items to other items. Third, the cross-synchronization components 116, 136 should be arranged to perform change detection to detect whether properties need to be cross-synchronized. For example, the cross-synchronization components 116, 136 should know whether a change made to an OUTLOOK item needs to be propagated to an LOB item or vice-versa. Fourth, the cross-synchronization components 116, 136 should be arranged to implement ownership rules. For example, the ownership rules may be used to assign which client does an update and avoid duplicate updates of certain items. Fifth, the cross-synchronization components 116, 136 should be arranged to handle business errors. For example, related to groups of associated items that are edited together and where consistency should be maintained, the cross-synchronization components 116, 136 should handle errors when synchronizing with the LOB system. Sixth, the cross-synchronization components 116, 136 should be arranged to handle conflicts. The cross-synchronization components 116, 136, however, do not necessarily need to detect conflicts directly since the synchronization circuits 118, 138 may perform such operations. Seventh, the cross-synchronization components 116, 136 should be arranged to handle expropriation issues. The cross-synchronization components 116, 136 should handle waiting for inconsistencies to be resolved and how long to wait. Eighth, the cross-synchronization components 116, 136 should be arranged to perform "Undo" and "PST" handling operations. For example, a user should be able to delete an item and then select the "Undo" feature to restore the original state. Ninth, the cross-synchronization components 116, 136 should be arranged to handle the OUTLOOK behavior of replacing meetings and tasks when updates arrive. All user specific information attached to the item will be lost with every update. Tenth, the cross-synchronization components 116, 136 should be arranged to support "Monikers." For example, the cross-synchronization components 116, 136 should handle links to "Bound items" in emails and elsewhere. Following the link opens the OUTLOOK item with the associated information. The monikers may use, for example, the Client ID or the LOB ID.

In various embodiments, the cross-synchronization components 116, 136 may not have control or influence over the synchronization circuits 118, 138. For example, the cross-synchronization components 116, 136 may not be informed as to when synchronization operations will happen or even when they have occurred. Consequently, changes made in the background could lead to a conflict with a change a user made, therefore leading to an unpredictable conflict. Accordingly, the cross-synchronization components 116, 136 should be arranged to change OUTLOOK items only when the user expects the OUTLOOK item to change, thereby avoiding background updates to OUTLOOK items when possible.

Every time an OUTLOOK item is changed, the changed item synchronizes through server 102 via the synchronization circuit 118. This synchronization may lead to conflicts with other changes, made by the system or made by a user, and it may not be predictable which change would win. Therefore there should be a practical limit to the number of changes allowed for OUTLOOK items. This does not present a problem when the system makes a change when the user is editing the item since the UI will save these changes together. The cross-synchronization components 116, 136, however, should try to avoid making changes to the item in background when possible.

In various embodiments, the cross-synchronization components 116, 136 should be arranged to perform consistency checks between information stored by the client databases 112, 114 and/or the client databases 132, 134. For example, when a user changes a combined appointment and time registration in OUTLOOK, the two are shown in a single combined user experience, data view, or application program UI. If a pre-sales appointment with a customer is changed into a post-sales appointment at a different location on one client device, this is done in a single form in OUTLOOK. The two parts of the change (e.g., the appointment and the time registration), however, travel independently to the other client devices via different synchronization circuits 118, 138. The location change travels through the server 102 using the synchronization circuit 118, while the project change travels through the server 122 using the synchronization circuit 138. If the user opens the appointment on another client device and the change was only partly propagated, the combined information from the appointment and the time registration item will be inconsistent and the cross-synchronization components 116, 136 should notify the user. Further, the user should be informed as to which portion is out-of-date, and be provided with the option of correcting and saving the item.

In some respects, consistency and cross-synchronization are two related problems that may need different solutions. Having property promotion and demotion implies that the items should be kept consistent, and that they should roam together. The reverse is not necessarily true. In some cases the items should roam together and the user desires a warning if they do not roam together, but there may be no need for properties to be copied back and forth. This means that the group of items for which property promotion/demotion is defined is a subset of the group of items that should be kept consistent.

In various embodiments, the cross-synchronization components 116, 136 should be arranged to use consistency groups for all items that have to be kept consistent. A consistency group can contain an arbitrary set of OUTLOOK items, LOB items and other items. In one embodiment, every item can only be part of one and only one consistency group for those items that are part of the cross-synchronization process. In other cases, the cross-synchronization components 116, 136 only need to check whether the items have all been synchronized (roamed) together and warn when that is not the case, in which case the restriction no longer applies.

In general, consistency groups share a number of characteristics, features or implementation details. For example, a consistency group typically has a configuration. A consistency group also has a type. A consistency group instance has an identity. Items can be added and removed programmatically, as long as the items fit the definition of the group. Incomplete consistency groups are supported. For example, a consistency group that has a definition for three items may contain only two of those items.

For each consistency group, a consistency group-Item (CGI) is created that maintains all the consistency information. This CGI is stored in the CDS, and replicated using the standard CRUD mechanisms to the roaming service as represented by CGI circuit 190. The CGI may be replicated via either client-server systems 160, 170, through another network device or server or web service, or directly via peer-to-peer networking techniques. The embodiments are not limited in this context.

The CGI has all the required key information as well as version information. Depending on the capabilities of the item type and the synchronization circuit, the version information can be a hash over all attributes, a timestamp or some other unique version identifier. For each item type, the cross-synchronization components 116, 136 may use a plug-in. If the CGI information does not match one or more items, the group is inconsistent and the cross-synchronization components 116, 136 can deduce which parts are more recent.

In various embodiments, the cross-synchronization components 116, 136 use a roaming service to synchronize information between the various internal client databases of client devices 108, 128. In one embodiment, for example, the CGI is personal where it roams between the devices of a user but is not shared between users. The cross-synchronization components 116, 136 may use one or both of the synchronization circuits 118, 138 to roam/synchronize the CGI.

In various embodiments, the cross-synchronization components 116, 136 provide an API for applications that open, edit and save consistency groups. Every time a change is made or detected that should be handled by the client device the new hash totals of the changed items are calculated and stored together with the new timestamps. The CGI will then be synchronized with the other systems.

In various embodiments, the cross-synchronization components 116, 136 may be arranged to perform promotion and demotion operations. The property promotion and demotion may be organized in the form of event handler descriptions. For example, descriptions may be provided to describe which properties are copied under various conditions, such as when a new LOB item is created from an OUTLOOK item, a new OUTLOOK item is created from an LOB item, an LOB item is associated with an OUTLOOK item, an OUTLOOK item's properties have been changed, an LOB item's properties have been changed, both OUTLOOK and LOB item have been changed (automatic conflict resolution), the OUTLOOK item has been deleted, the LOB item has been deleted, the items are saved together, the items are being edited, and so forth. Logic should be implemented to restrict the binding (e.g., promotion and demotion) behavior to avoid cascading updates. An example of a cascading update may include a change to an outlook item that causes updates to 5 LOB items, each of which may update other OUTLOOK items, and so on. This condition should be avoided where possible.

In general operation, the cross-synchronization components 116, 136 perform cross-synchronization operations only in the context of a consistency group. In one embodiment, for example, the cross-synchronization components 116, 136 should only be executed between items in the same consistency group. Within the consistency group, the solution defines for each event which properties have to be propagated between items. A new item in a synchronization store (e.g., a new LOB item in the client databases 112, 114) may trigger the creation of a new consistency group. For example, an LOB item sent by the LOB system may result in the creation of multiple OUTLOOK items. That LOB item will then have a promotion/demotion relationship with those OUTLOOK items. All clients involved in cross-synchronization operations should be arranged to handle the entire promotion/demotion group where all LOB Entities are available, otherwise the clients should ignore the promotion/demotion behavior.

For each event, the consistency group definition contains a definition of the promotion demotion event specific behavior. The definition may include a list of operations that define, for example, item creation, item deletion, properties to be copied from source items to destination items, sequence of copies, and so forth. If an operation is defined for which either source or destination item is not part of the group, the operation is skipped. Promotion/demotion behavior may be implemented as a pluggable component, and the behavior can be arbitrarily modified and in some cases include some business logic. The consistency group definition specifies in which order the items must be saved and what must be done in case of failure. Alternatively, the list of operations or an individual operation can be replaced by a work flow schedule.

The capabilities of the item type and of the synchronization circuit determine whether an item can be created, deleted, be the source or be the destination of an operation. This may be event specific. The plug-in for a particular type can define these capabilities, such as through the use of attributes, for example.

For each item type, a plug-in is specified. The plug-in is asked to extract property information, set property information, save the item and other operations that are needed. For example, the cross-synchronization components 116, 136 do not need to know the data format or any other specifics of the items. A promotion/demotion handler can be used to take care of the cross-synchronization operations for a specific consistency group type.

Changes to an OUTLOOK item or an LOB item need to be propagated to other items. The synchronization system 100 detects that the item has changed and that the changes have to be propagated. This is addressed by storing a hash over the source properties of the promotion/demotion with the item. For example, this may be a set of source properties for change events. When the calculated hash does not match the stored hash, this indicates that a non LOBi application has changed the item. The cross-synchronization components 116, 136 do not need know if any of the other attributes were changed.

The synchronization system 100 stores the hash total over all source properties for the change event with the item. Changes that do not affect the calculated hash are ignored. When the calculated hash differs from the stored hash, at least one of the LOBi systems has to execute the property promotion/demotion. If the item type has no capability of storing the hash, the type cannot participate as a source object for promotion/demotion.

In various embodiments, the cross-synchronization components 116, 136 may need to handle ownership issues. Ownership is about who is responsible for keeping or bringing the items of a consistency group in a consistent state. If a LOBi application makes a change, that LOBi application is responsible for a consistent end result. If another client receives part of the change before the rest arrives, that other client will just wait until the rest arrives as per the change detection operations. If an item was changed by a non LOBi application such as OWA, pocket OUTLOOK or by an LOB application such as the SAP portal, however, the changes need to be propagated and they need to be propagated only once. This is an area where the different capabilities of the synchronization circuits 118, 138 may be used. For example, assume a change made through exchange is detected and needs to be propagated via the change detection logic. If multiple clients do this in parallel, the CRUD-sync via synchronization circuit 138 receives multiple requests for essentially the same update. The values of the LOB item will be the same, but the version information defined for the consistency group will be different. The synchronization circuit 138 will be able to resolve this conflict.

The other synchronization case may be more complex due to the lack of control over the synchronization operations. For example, a change made through an LOB system and propagated by the CRUD-sync to the client databases 114 or 134 should not be handled by multiple clients because that would lead to conflicts in OUTLOOK. Here it is possible that new OUTLOOK items must be created and while avoiding the creation of duplicates. Even updating the same item on different machines will lead to (often hidden) duplicates in OUTLOOK, however, and the additional hash and version information will lead to additional complications. It is worthy to note that the possible functionality within any given consistency group are defined by the capabilities of the item types and their synchronization channels. If the destination's synchronization circuit does not support duplicate detection, then cross-synchronization requires ownership logic. If the destination's synchronization circuit does support duplicate detection, then cross-synchronization operations can proceed to apply the change.

Based on the capabilities of the destination(s), ownership has to be established. If the destination items are LOB items, all clients may execute the promotion/demotion behavior. If the destination includes an OUTLOOK item, ownership has to be assigned first so that only one client makes the change. This information is maintained in the configuration and it can be set by the designer of the solution.

In various embodiments, the cross-synchronization components 116, 136 use an ownership service that allows a client to request ownership for a particular version of a particular consistency group. In order to execute an event that is marked to require ownership, the client requests ownership over the current version. If granted, the client executes the event either immediately or later. Ownership for a particular version is permanent. No other client will automatically try to execute the same event. The user may always open the item and force execution of the event on a system without ownership. This may lead to a conflict which should be resolved automatically if possible. Once ownership has been assigned, it does not change anymore. This means that if the communication was incomplete, the same client will receive the same ownership information again for that particular version. The Device-ID is added to the CGI. Ownership is reset with every subsequent change to the same item.

In various embodiments, the cross-synchronization components 116, 136 may be arranged to handle various business errors. Related to groups of associated items, that are edited together and where consistency is maintained, is the problem of dealing with errors when synchronizing with the LOB system. A single form often lets a user edit multiple items simultaneously. These items are saved together and then synchronized independently. If a business error is reported while synchronizing one of the items, the changes are not accepted by the backend system. Thus, when subsequent clients synchronize they will not receive the rejected item, but they will receive the other ones and thus be in an inconsistent state.

When the LOB returns a business error, CRUD-sync notifies the cross-synchronization components 116, 136. The cross-synchronization components 116, 136 will then store the error information as well as the rejected version (e.g., probably the delta) in the CGI. Cross-synchronization operations restore the original item. If the data access layer (DAL), the CDS and the CRUD-sync logic support this feature, the item itself will be set to error. The CGI as well as all accepted items will be synchronized to the other clients so that all clients can present the same user experience. The user experience has available all the changed information, the original version of the rejected item and the error information as returned by the LOB. The CGI as well as all accepted items will be synchronized to the other clients so that all clients can present the same user experience.

In various embodiments, the cross-synchronization components 116, 136 may be arranged to handle conflicts. In one embodiment, for example, conflicting changes will be detected by the synchronization circuits 118, 138. The cross-synchronization components 116, 136 will not try to detect conflicts, but rather attempt to detect those conflicts detected by the synchronization circuits 118, 138. When the CRUD-sync (e.g., synchronization circuit 138) detects a conflict, the cross-synchronization components 116, 136 will be involved in the resolution of that conflict. The same goes for conflicts detected by the synchronization circuit 118. Conflicts detected by the EXCHANGE synchronization will be resolved where the last one wins. The synchronization system 100 may have to detect that the synchronization circuit 118 resolved a conflict and then deal with the possible inconsistency.

In a first example of conflict, a user changes a group of items from version X to version A on the client device 108 and to B on the client device 128 as illustrated in Table 1 as follows:

TABLE 1

| | Exch: X | |
|---|---|---|
| O: X-A | | O: X-B |
| L: X-A | | L: X-B |
| | MT: X | |
| | LOB: X | |

Assume that exchange synchronizes first and that it lets version A "win." The copy of B is retained as illustrated in Table 2 as follows:

TABLE 2

| | Exch: A (B) | |
|---|---|---|
| O: A | | O: A (B) |
| L: X-A | | L: X-B |
| | MT: X | |
| | LOB: X | |

The version in Exchange holding the copy of both A and B, with only A directly visible for the user will have to synchronize back to the client device 108. Depending on the connection that may be almost immediate or it may take a while.

Almost simultaneously, the CRUD-Synchronization does its work and one of the clients will synchronize first. The middle tier and the LOB will just accept that version. Neither the client that synchronizes, nor the middle tier, will store the original information (X) any longer. The client that synchronizes later will still have it. The client device 108 synchronizes as illustrated in Table 3 as follows:

TABLE 3

| | Exch: A (B) | |
|---|---|---|
| O: A | | O: A (B) |
| L: A | | L: X-B |
| | MT: A | |
| | LOB: A | |

The client device 128 synchronizes as illustrated in Table 4 as follows:

TABLE 4

| | Exch: A (B) | |
|---|---|---|
| O: A | | O: A (B) |
| L: X-A | | L: B |
| | MT: B | |
| | LOB: B | |

The other side will then try to synchronize and a conflict is detected. CRUD sync, in contrast to Exchange sync, however, does not automatically choose one version over the other and it will retain all the relevant copies, including the original, the current version in the LOB and the conflicting version (X-A-B or X-B-A), as illustrated in Tables 5 and 6 as follows:

TABLE 5

| | Exch: A (B) | |
|---|---|---|
| O: A | | O: A (B) |
| L: A | | L: X-A-B |
| | MT: X-A-B | |
| | LOB: A | |

TABLE 6

| | Exch: A (B) | |
|---|---|---|
| O: A | | O: A (B) |
| L: X-B-A | | L: B |
| | MT: X-B-A | |
| | LOB: B | |

Eventually all clients will receive all relevant information, as illustrated in Tables 7 and 8 as follows:

TABLE 7

| O: A (B) | Exch: A (B) | O: A (B) |
|---|---|---|
| L: X-A-B |  | L: X-A-B |
|  | MT: X-A-B |  |
|  | LOB: A |  |

TABLE 8

| O: A (B) | Exch: A (B) | O: A (B) |
|---|---|---|
| L: X-B-A |  | L: X-B-A |
|  | MT: X-B-A |  |
|  | LOB: B |  |

The first client to have enough information should execute the conflict resolution. This conflict resolution may have changes that can be recognized by the CRUD synchronization as duplicates, but they may also have changes that will be treated as conflicts by the Exchange synchronization. Depending on the given scenario, the client has to request ownership before executing the conflict resolution.

This above-described example used above illustrates the importance of designing a solution for automatic conflict resolution. If A wins both in Exchange and in the backend, there is technically a consistent state. If A wins in Exchange and B in the backend, there is clearly an inconsistency. In one embodiment, for example, the cross-synchronization components 116, 136 will let A win in the first situation, but it will let the user know that a conflict has been resolved. The user will be able to select the alternative and change to B.

The consistency group will be set to an error state in the second case, similar to the case of a business conflict, and the user will be given the choice between A and B to correct the situation.

In a second example of a conflict, assume a user makes a change on the client device 108 as illustrated in Table 9 as follows:

TABLE 9

| O: X → A | Exch: X | O: X |
|---|---|---|
| L: X-A |  | L: X |
|  | MT: X |  |
|  | LOB: X |  |

Only part of the information synchronizes to the client device 128, as illustrated in Table 10 as follows:

TABLE 10

| O: A | Exch: A | O: A |
|---|---|---|
| L: X-A |  | L: X |
|  | MT: X |  |
|  | LOB: X |  |

The user decides to open the item on the client device 128. The cross-synchronization components 116 and/or 136 detect the inconsistency and warn the user. Despite this, the user changes the item and saves it, as illustrated in Table 11 as follows:

TABLE 11

| O: A | Exch: A | O: A → B |
|---|---|---|
| L: X-A |  | L: X-B |
|  | MT: X |  |
|  | LOB: X |  |

If the synchronization circuits synchronize the items, some will detect conflicts and others will not, because there was none on that synchronization circuit. The desired outcome, however, is for the last change (B) to win.

The cross-synchronization components 116 and/or 136 will mark the event in the CGI and the client devices 108, 128 will resolve the conflict automatically. The user cannot revert back to version A, since the information is not completely available. In this example, the synchronization circuit 118 has detected no conflict and will only have version B available. If the synchronization circuit 138 is selected, however, the same would have been true. In one embodiment, all the missing information may be stored in the CGI to alleviate such problems.

In various embodiments, the cross-synchronization components 116, 136 offer a configurable conflict resolver. The configurable conflict resolver provides configuration information of the given synchronization component. The configurable conflict resolver provides a default configurable component, which if the situation is consistent, leaves the situation as is, allowing the user to change as shown in the first example. If the situation is inconsistent as shown in the second example, the configurable conflict resolver provides a three way merge (e.g., attribute level merge), a time-based winner (e.g., last one wins), a source-based winner (e.g., client wins vs. LOB wins), or leaves the conflict unresolved and treats it like a business error.

In various embodiments, the cross-synchronization components 116, 136 detect or are notified of a conflict on an LOB item. It has access to three versions, the original, the one the LOB currently has and its own conflicting version. It can detect whether the competing version which is the one already in the LOB was created by another LOBi client or directly in the LOB. If the competing version does not come from a LOBi client, there will not be any other related competing items and the conflict should be resolved immediately. The cross-synchronization components 116, 136 store all the conflict information in the CGI. All new versions of all items involved are stored in the CGI, until a new change to the group is made. An exception is made for those items that already store the information (e.g., OUTLOOK). The user is then notified in a configurable manner. If the competing version does come from a LOBi client, the system waits for the CGI to arrive or cross-synchronization operations continue to the next stage of operations. If the cross-synchronization components 116, 136 detect a conflict on the CGI, it waits until all items in conflict have arrived and then continues operation.

If the cross-synchronization components 116, 136 have the complete conflict information, including the CGI as well as all items involved in the conflict, then the cross-synchronization components 116, 136 resolve the conflict. The configurable conflict resolver may be used for conflict resolution logic for a desired implementation. The cross-synchronization components 116, 136 store all the conflict information in the CGI. All new versions involved of all items involved are stored in the CGI, until a new change to the group is made. An exception is made for those items that already store the information (e.g., OUTLOOK)

If the cross-synchronization components 116, 136 detect that a user has selected an alternative version in OUTLOOK via a non-LOBi application, then the appropriate cross-synchronization component requests ownership and makes the group consistent. This may be accomplished by either selecting the corresponding versions from the CGI, or by applying property promotion/demotion. The cross-synchronization components 116, 136 update the CGI. The cross-synchronization components 116, 136 support the application (e.g. OUTLOOK Add-In) to select another version.

In various embodiments, the cross-synchronization components 116, 136 may handle expropriation cases. In some cases the synchronization system 100 must wait for complete information. This information may arrive at some point or it may never arrive for a variety of reasons. The user may have done something or another system may have crashed or just used for other purposes. These cases involve: (1) incomplete synchronization or update governed by a lease; (2) incomplete synchronization of a consistent change on another LOBi client; and (3) incomplete conflict information. The problem is the same for all three cases, which is deciding whether to wait for the rest to arrive, which may or may not happen, or determining that an appropriate wait period has expired to allow the user to continue working.

The synchronization system 100 can detect partial synchronization. In some cases the synchronization system 100 can resolve the issue because it knows that duplicate updates will only incur communication and computational overhead but no incorrect or confusing behavior. Just a warning in the header of the message showing a conflict has been resolved may be suitable. In these cases, the partial update can be completed on the device shortly after detection.

Other cases, however, are more critical, such as the creation of a new OUTLOOK item or partial propagation of a change that affected multiple items. Instead of automatically resolving these, the synchronization system 100 can offer the user the information on the item itself or in the System Tray Application, with a message indicating "Updates have been made elsewhere that have not synchronized completely: Click here to see a list of incomplete items" and some additional warnings about resolving these conflicts on the subsequent screens. Selecting an item, editing and saving it, creates a new version of the items and of the group. This new version would then override any pending changes.

The expropriation logic may include the synchronization system 100 performing updates for non-critical changes after a short delay. The delay could be defined based on typical synchronization intervals and the particular usage scenario. Examples of non-critical changes could include property promotion demotion to items with a synchronization circuit that detects and removes duplicates, updates that only affect items using the synchronization circuit 138 including the CGI, and so forth. The synchronization system 100 provides information about partially updated consistency groups in the item if possible, through the System Tray Application, and after some delay interval (e.g., 20-30 minutes). The system lets the user choose to ignore the pending synchronization and continue working In various embodiments, the cross-synchronization components 116, 136 may be arranged to handle meeting items and task items. One problem associated with meetings and tasks is that updates replace the existing items. So, if a user is invited for a meeting, and the user modifies the appointment by adding properties, consistencies, and so forth, those modifications will be lost when the user sends an update. This will occur at the moment the user views the update in the preview pane in OUTLOOK and when the user opens the item if the preview is not used. Replacement of the item has the consequence that the item no longer has the same Entry ID in OUTLOOK, and therefore must be found using the Global Object ID. The cross-synchronization components 116, 136 should ensure that meetings and tasks are corrected after being updated (e.g., add the hash, promotion and demotion) and that the consistency group is updated.

In various embodiments, the cross-synchronization components 116, 136 may be arranged to handle monikers. External applications must be able to refer to OUTLOOK items that are associated to LOB items using an LOB ID. The moniker logic requires that it is possible to open an OUTLOOK item using information of the consistency (LOB type and ID), it is possible to use the monikers as links in emails and documents, and resolution of a moniker should be relatively fast. The consistency groups in the CDS may be used to fulfill these requirements.

In various embodiments, the cross-synchronization components 116, 136 may be arranged to state information for an item. Per item state information needed by the cross-synchronization components 116, 136 may be stored in the item itself, for instance when it is managed by the service (e.g., LOB service, EXCHANGE service, or otherwise), or it may be stored in the "envelope" of the item if the property is not available in the original item and the item is managed by the synchronization circuit 138.

With each item in an consistency group various types of information are stored, such as a unique identifier of the item which may be different for the various item types, a consistency group-Item ID (CGI-ID), a globally unique ID (GUID), a hash calculated over the source attributes used for cross-synchronization operations (e.g., Source-Hash), a unique version identifier for the item such as a timestamp, the timestamp of last change when available on/with the item, and so forth.

In each consistency group item various types of information are stored, such as a CGI-ID, version ID for the CGI, the synchronization circuit provided timestamp, a Device-ID defining ownership, and so forth. Per Item state information includes the item type to assist in finding the type information in associated metadata, the ID information for the item, the type information and the LOB-ID for LOB items, the Entry ID and the GUID, a unique version identifier for the item, a timestamp of last change when available on/with the item, any error information or conflict information, an error message in the user's language, the state of the rejected item (the original item is restored), information about knowingly created conflicts (all item information), and so forth.

In various embodiments, the cross-synchronization components 116, 136 may maintain and store various types of metadata information as well. For each consistency group type, there is a need for the following definitions: (1) consistency group type; (2) a list of Item Types; and (3) for each type and Item Type, plug-in specification(s) and supported events. For each supported event which are assumed to be item specific, information is stored such as ownership specification if ownership needed, a sequence of operations In various embodiments, the cross-synchronization components 116, 136 may be implemented using a provider model with pluggable components, sometimes referred to as "plug-ins." For example, a CRUD-sync plug-in may be used for the synchronization circuit 138. In another example, an OUTLOOK-EXCHANGE-sync plug-in may be used for the synchronization circuit 118. Each plug-in is typically a separate component and may use separate schemas. Other plugged storage and synchronization providers need their own definitions and thus schemas and pluggable components.

The cross-synchronization architecture may also define a set of interfaces for these plug-ins In various embodiments, the cross-synchronization components 116, 136 may implement logic to perform the various cross-synchronization operations previously described, as well as others. In one embodiment, for example, the various events as described are the individual state changes that cross-synchronization components 116, 136 need to detect and use as a trigger for action. These events can be generated by CRUD-sync or can be generated by a sweeping process in OUTLOOK. There can be many types of defined events and delivery mechanisms for the event, all of which are designed to initiate cross-synchronization operations.

The basic cross-synchronization operations performed by the cross-synchronization components 116, 136 may be as follows. First, ownership may be obtained by a client device before the client device can make changes in background. The client device may call an ownership service using the current version of the CGI. If the Device-ID for the calling client device is returned, then this information is stored in the CGI, and a TRUE value is returned to indicate that ownership has been obtained by the calling client device. If another Device ID is returned, however, then this information is stored in the CGI, and FALSE value is returned to indicate that ownership has been obtained by another client device.

In the event of a LOBi change, a calculated source-hash value is assigned to a stored source-hash value.

The cross-synchronization components 116, 136 need to determine whether an item is part of consistency group to deal with the exceptional OUTLOOK behavior of overwriting items in case of meeting requests and task requests. If the item has no CGI-ID, and if the item is a meeting or task that is the result of an invite, and if there is no CGI that contains the item ID (e.g., the Global Object ID), then return that the item is not part of a consistency group. If any of these test are FALSE, then return the CGI-ID.

The cross-synchronization components 116, 136 need to get to collect the information from all items in order to see whether the consistency group is consistent. It also needs to deal with pending events. For instance when the user opens an item immediately after connecting to the network, there may be a list of queued actions for the CDS or events from the CDS. The CGI may be opened, and for each item in the CGI a request is made for pending events, and the item is read. If requests are pending, then the pending requests are sorted, and the sorted requests are executed in sequence. Affected items are then saved.

If cross-synchronization components 116, 136 do not have all information and expects more information will arrive, cross-synchronization components 116, 136 have to wait for subsequent events. These events may never arrive, however, for various reasons. In one embodiment, for example, the cross-synchronization components 116, 136 will wait for subsequent events, but set a marker that it is waiting. This marker may be interpreted by the System Tray Icon application or other user interface after a time delay to display a user warning.

In some cases, the cross-synchronization components 116, 136 may also handle incoming Create/Update/Delete (CUD) notification on an item. These notifications may stem from the CRUD-Sync or from any another provider. OUTLOOK will use a sweeper process to detect changes and then notify cross-synchronization components 116, 136. If a "create" of an item is received, the cross-synchronization components 116, 136 are interested to know if a new consistency group has to be created. This is the same or similar for all item types, including OUTLOOK items. If a create event is registered for the item type, and if ownership is not required or ownership is obtained, then a new CGI is created, and the "Create" event operations are executed. If the incoming CUD notification is an "update," then the synchronization circuit 138 notifies the appropriate cross-synchronization component 116, 136 of an incoming LOB item. The assumption is that CRUD-synchronization instantiates one or more cross-synchronization components 116, 136, and calls it. If the incoming CUD notification is a "delete," and if event source item is member of a CGI, and if the consistency group is consistent, and if ownership is not required or ownership is obtained, then the event operations are executed (e.g., the promotion/demotion logic), and the CGI is updated. Otherwise, cross-synchronization components 116, 136 may assume that the incoming item is newer than the local items, and wait and notify operations may be performed.

In some cases, the cross-synchronization components 116, 136 may also handle incoming CUD notification on a CGI. If the incoming CUD notification is a "create," "update" or "delete," and if the consistency group is not consistent, then perform wait and notify operations.

In some cases, the cross-synchronization components 116, 136 may also receive conflict notifications from one or more of the synchronization circuits 118, 138. These notifications may stem from the CRUD-sync or from any other provider. OUTLOOK will use a sweeper process to detect changes and then notify the cross-synchronization components 116, 136.

If the event source item is member of a CGI or is the CGI, and if the consistency group is consistent AND NOT the LOB-Version's is a LOBi Change OR all conflict information is available, then the conflict information is stored in the CGI, and all new versions involved of all items involved are stored in the CGI until a new change to the group is made. An exception is made for those items that already store the information (e.g., OUTLOOK). If automatic conflict resolution has been configured for this type, and if ownership is not required or ownership is obtained, then the change event is executed, otherwise wait and notify operations may be performed. The default handling is performed as defined for the specific item-type.

In some cases, the cross-synchronization components 116, 136 may also perform conflict manipulation, where the sweeper detects that a user has selected an alternative version in OUTLOOK and notifies the cross-synchronization components 116, 136, which should have happened via a non-LOBi application. If ownership is not required or ownership is obtained, then the group should be made consistent either by selecting the corresponding versions from the CGI, or by applying property promotion/demotion logic, and the CGI is then updated. Otherwise, wait and notify operations are performed.

In some cases, the cross-synchronization components 116, 136 may also implement conflict resolution logic. For example, the user selects one version over the other. The application communicates this through the cross-synchronization API. The consistency group is then made consistent either by selecting the corresponding versions from the CGI or by applying property promotion/demotion, and the CGI is updated.

In various embodiments, the cross-synchronization components 116, 136 may be arranged to handle events in consistency aware LOBi applications. For example, assume an item is opened in a consistency aware LOBi application. The OUTLOOK Add-In or any other consistency aware LOBi application checks with the cross-synchronization components 116, 136 to determine if there is a CGI for this item. If the item is part of a consistency group, and if the items are inconsistent with the CGI, then the change event handler is executed for the item(s). The change event handler may perform property promotion/demotion in memory, for example. The user then receives a notification.

In various embodiments, the cross-synchronization components 116, 136 may be arranged to save items in a consistency aware LOBi application. In some cases, ownership needs to be established under certain circumstances, such as on delete events because that removes the hash unless the envelope can still be roamed after the delete. To handle offline, the application (such as an OUTLOOK Add-in or any other consistency aware LOBi application) saves the group using the cross-synchronization API. If needed, a CGI is created. If an item was deleted, and if ownership is not obtained, then this state may be ignored and processing continues. The cross-synchronization component 116, 136 adds the appropriate envelope information to the items, which may include a hash over cross-synchronization source attributes, possibly a timestamp or CGI-ID, and so forth. If the item was inconsistent on open then conflict resolution information is also stored in the CGI. For each item, the cross-synchronization components 116, 136 saves the items and adds the timestamp and other item information to the CGI. The cross-synchronization components 116, 136 then save the CGI.

In various embodiments, the cross-synchronization components 116, 136 may call certain binding events for the LOBi aware client application through the cross-synchronization API. For example, a new consistency group event (bind) may be called to create a new CGI. Header information may be added for each item, and any necessary housekeeping operations may be performed. In another example, a remove consistency group event (unbind) may be called. Header information may be removed for each item, and the CIG may be deleted. In yet another example, an add item to consistency group event may be called. The item is added to the CGI, and the appropriate header information may be added to the item. In still another example, a remove item from consistency group event may be called. Header information is removed from the item, and the item is removed from the CGI.

Operations for the synchronization system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the synchronization system 100 or alternative elements as desired for a given set of design and performance constraints.

FIG. 2 illustrates a logic flow 200. The logic flow 200 may be representative of the operations executed by one or more embodiments described herein. As shown in FIG. 2, the logic flow 200 may modify a first data item for a first application program and a second data item for a second application program at a first client device at block 202. In one embodiment, for example, the first data item may be stored in a first client database, and the second data item may be stored in a second client database, at the first client device. The corresponding first data item may be stored in a first client database, and the corresponding second data item may be stored in a second client database, at the second client device. The logic flow 200 may initiate synchronizing operations to synchronize the first data item with a corresponding first data item and the second data item with a corresponding second data item at a second client device using respective first synchronization circuit and second synchronization circuit at block 204. The logic flow 200 may determine whether the corresponding first data item is consistent with the corresponding second data item at the second client device at block 206. The embodiments are not limited in this context.

In one embodiment, for example, a user may be notified if the corresponding first data item is inconsistent with the corresponding second data item. The user may be notified whether the corresponding first data item or the corresponding second data item is not synchronized. Synchronization may be performed for the corresponding first data item or the corresponding second data item if either one is not synchronized. The embodiments are not limited in this context.

In one embodiment, for example, a consistency group may be created with the first data item and the second data item. A consistency group item may be defined to store consistency group information for the consistency group including the first data item and the second data item. A determination may be made whether the corresponding first data item is consistent with the corresponding second data item at the second client device using the consistency group item having the consistency information for the consistency group including the first data item and the second data item. The embodiments are not limited in this context.

Figure 3:
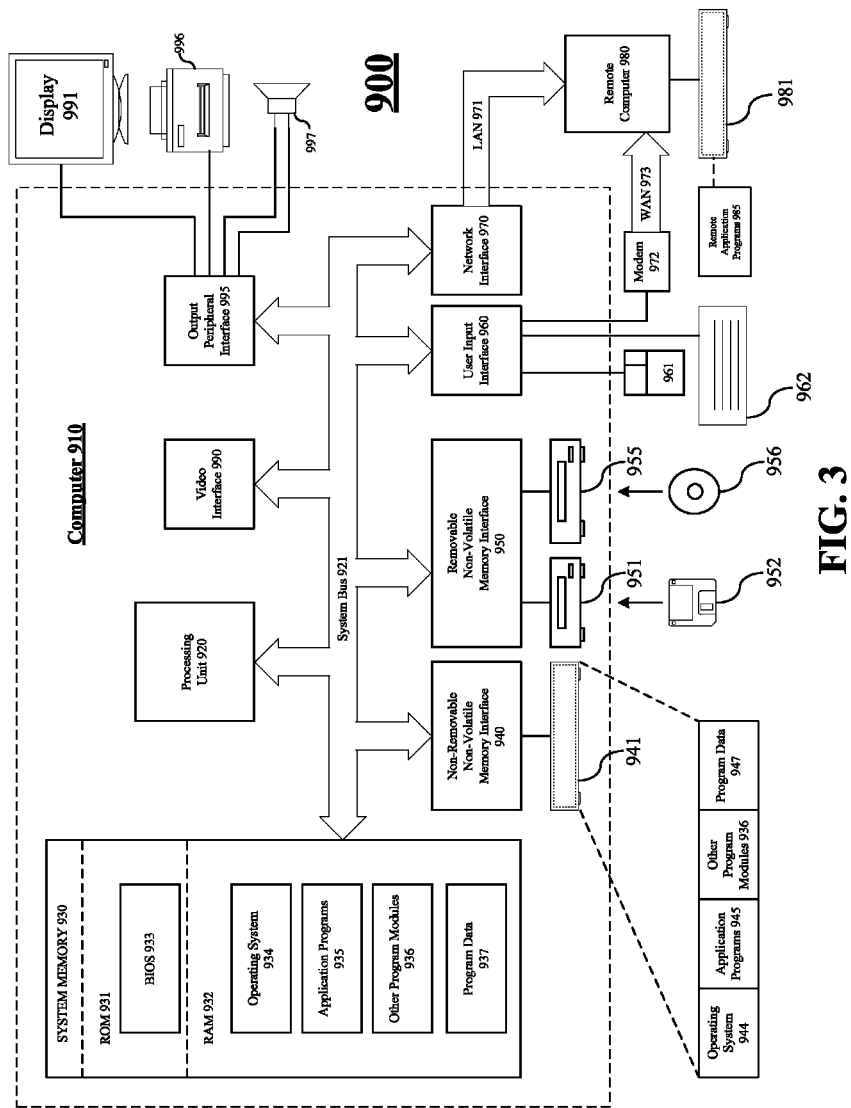
FIG. 3 illustrates one embodiment of a computing system architecture.

FIG. 3 illustrates a block diagram of a computing system architecture 900 suitable for implementing various embodiments, including the synchronization system 100. It may be appreciated that the computing system architecture 900 is only one example of a suitable computing environment and is not intended to suggest any limitation as to the scope of use or functionality of the embodiments. Neither should the computing system architecture 900 be interpreted as having any dependency or requirement relating to any one or combination of components illustrated in the exemplary computing system architecture 900.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 3, the computing system architecture 900 includes a general purpose computing device such as a computer 910. The computer 910 may include various components typically found in a computer or processing system. Some illustrative components of computer 910 may include, but are not limited to, a processing unit 920 and a memory unit 930.

In one embodiment, for example, the computer 910 may include one or more processing units 920. A processing unit 920 may comprise any hardware element or software element arranged to process information or data. Some examples of the processing unit 920 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 920 may be implemented as a general purpose processor. Alternatively, the processing unit 920 may be implemented as a dedicated processor, such as a controller, microcontroller, embedded processor, a digital signal processor (DSP), a network processor, a media processor, an input/ output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 910 may include one or more memory units 930 coupled to the processing unit 920. A memory unit 930 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 910. The embodiments are not limited in this context.

In one embodiment, for example, the computer 910 may include a system bus 921 that couples various system components including the memory unit 930 to the processing unit 920. A system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 910 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 900. Examples of computer readable media for computing system architecture 900 may include, but are not limited to, volatile and/or nonvolatile memory such as ROM 931 and RAM 932. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 930 includes computer storage media in the form of volatile and/or non-volatile memory such as ROM 931 and RAM 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 3 illustrates operating system 934, application programs 935, other program modules 936, and program data 937.

The computer 910 may also include other removable/non-removable, volatile/nonvolatile computer storage media. By way of example only, FIG. 3 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 3, provide storage of computer readable instructions, data structures, program modules and other data for the computer 910. In FIG. 3, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor 991, computers may also include other peripheral output devices such as speakers 997 and printer 996, which may be connected through an output peripheral interface 990.

The computer 910 may operate in a networked environment using logical connections to one or more remote computers, such as a remote computer 980. The remote computer 980 may be a personal computer (PC), a server, a router, a network PC, a peer device or other common network node, and typically includes many or all of the elements described above relative to the computer 910, although only a memory storage device 981 has been illustrated in FIG. 3 for clarity.

The logical connections depicted in FIG. 3 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other technique suitable for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 3 illustrates remote application programs 985 as residing on memory device 981. It will be appreciated that the network connections shown are exemplary and other techniques for establishing a communications link between the computers may be used. Further, the network connections may be implemented as wired or wireless connections. In the latter case, the computing system architecture 900 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the managed taxonomy entity model system 100 and/or computing system architecture 900 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously provided for the memory unit 130. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A computer-implemented method, comprising:
modifying a first data item for a first application program and modifying a second data item associated with the first item for a second application program at a first client device;
synchronizing said first data item with a corresponding first data item and said second data item with a corresponding second data item at a second client device using, respectively, a first synchronization circuit between the first application and a first server and a second synchronization circuit between the second application and a second server;

detecting a conflict between the first data item on the first client device and the corresponding first data item on the second client device during the synchronization operation;

resolving the conflict with a configurable conflict resolver; and determining whether said corresponding first data item is consistent with said corresponding second data item with a cross-synchronization circuit at said second client device.

2. The method of claim 1, further comprising:
resolving the conflict by at least one of: a three way merge, a time-based winner, or a source-based winner.

3. The method of claim 1, further comprising:
creating a consistency group including the first and second data items on the first client and the corresponding first and second data items on the second client; and
assigning one of the first and second clients to be the owner of a version of the consistency group, wherein the owner is responsible for keeping the data items in the consistency group in a consistent state.

4. The method of claim 3, further comprising resolving the conflict by:
receiving an ownership request of a consistency group from one of the first and second clients;
granting ownership of the consistency group to the requesting client; and
synchronizing the modified data items from the requesting client.

5. The method of claim 4, further comprising:
requesting ownership of a consistency group from a client that is the first to have information regarding all conflicting changes to the first data item.

6. The method of claim 3, wherein the consistency group includes property promotion/demotion operations to define which properties of a data item in the consistency group are copied and a sequence of copying when a condition occurs.

7. The method of claim 6, wherein a condition comprises at least one of: creation of the second data item for the second application from the first data item of the first application; association of the first data item for the first application to the second data item for the second application; change of a property of the first data item; deletion of the first data item; changes to each of the first data item and the second data item; saving of each of the first data item and the second data item together; and editing of each of the first data item and the second data item.

8. The method of claim 7, further comprising:
preventing cascading updates with the property promotion/demotion operations.

9. An article comprising a computer-readable storage medium with memory containing instructions that when executed cause a processing unit in a system to:
modify one or more data items for a first application program and modify one or more data items for a second application program at a first client, wherein the data items for the first application program are associated with the data items for the second application program;
update a consistency group item with the modifications, wherein the consistency group item maintains consistency information between associated data items;
detect a conflict when attempting to synchronize the modified data items with a second client; and
resolve the conflict with a configurable conflict resolver 10. The article of claim 9, the medium further comprising instructions that when executed cause the system to:
resolve the conflict by at least one of: a three way merge, a time-based winner, or a source-based winner.

11. The article of claim 9, the medium further comprising instructions that when executed cause the system to:
assign one of the first and second clients to be the owner of a version of a consistency group including the one or more data items for the first and second applications, wherein the owner is responsible for keeping the data items in the consistency group in a consistent state.

12. The article of claim 11, the medium further comprising instructions that when executed cause the system to resolve the conflict by:
receiving an ownership request of a consistency group from a client;
granting ownership of the consistency group to the requesting client; and
synchronizing the modified data items from the requesting client.

13. The article of claim 12, the medium further comprising instructions that when executed cause the system to:
request ownership of a consistency group from a client that is the first to have information regarding all conflicting changes to a data item.

14. An apparatus comprising:
a cross-synchronization component to:
synchronize multiple associated data items for different application programs between multiple client devices synchronized using multiple synchronization circuits to multiple servers,
determine whether changes to said multiple data items for said different application programs made at a first client device are propagated to a second client device using consistency information maintained by a consistency group item for a consistency group including said associated data items, the consistency group including property promotion/demotion operations to define event specific behavior for a property of a data item.

15. The apparatus of claim 14, wherein property promotion/demotion operations comprise event handler descriptions that describe which properties are copied and a sequence of copying when a condition occurs.

16. The apparatus of claim 15, wherein a condition comprises at least one of: creation of a data item for a second application from a data item of a first application; association of a first data item for a first application to a second data item for a second application; change of a property of a first data item for a first application associated with a second data item for a second application; deletion of a first data item for a first application associated with a second data item for a second application; changes to each of a first data item for a first application associated with a second data item for a second application and the second data item; saving of each of a first data item for a first application associated with a second data item for a second application and the second data item together; and editing of each of a first data item for a first application associated with a second data item for a second application and the second data item.

17. The apparatus of claim 14, wherein the property promotion/demotion operations are restricted to prevent cascading updates.

18. The apparatus of claim 14, wherein a first data item from a first application that causes a second data item to be created in a second application has a promotion/demotion relationship with the second data item, and the first and second data items form a promotion/demotion group that is a subset of the consistency group that includes the first and second data items.

19. The apparatus of claim 14, the cross-synchronization component further to:
  detect a conflict during cross-synchronization
  request ownership of a consistency group that includes the data items that are conflicting; and
  make the consistency group items consistent.

20. The apparatus of claim 19, the cross-synchronization component further to make the consistency group items consistent by at least one of:
  detecting a manual selection of a version of consistency group item different from a version selected by automatic conflict resolution;
  selecting the manually selected version as the conflict winner; or
  applying property promotion/demotion to the data items in the consistency group.

* * * * *